United States Patent Office 3,219,823
Patented Nov. 23, 1965

3,219,823
NARROW-BAND RADIATION DETECTOR USING CYCLOTRON RESONANCE
Alan Frank Gibson, Deryck William Goodwin, and Renallt Hill Jones, Malvern, England, assignors to National Research Development Corporation, London, England, a British corporation
Filed Apr. 5, 1962, Ser. No. 185,396
Claims priority, application Great Britain, Apr. 25, 1961, 14,884/61
10 Claims. (Cl. 250—83.3)

The present invention relates to radiation detectors and has reference to detectors for use in the regions bridging the infrared and microwave lengths, say between $100\mu$ and 1 cm.

Most detectors for use in these regions are basically wide band devices. The limit of detectivity is set by thermal fluctuations from background radiation and does not exceed about $2 \times 10^{10}$ cm./watt. The detectivity for a narrow-band signal source can be increased beyond the radiation noise limit by the use of cooled filters and radiation shields; these expedients however suffer from inflexibility where work is carried out over a range of wavelengths.

It is an object of this invention to provide an improved narrow-band detector.

According to the invention a radiation detector comprises a mass of semiconductor material, means for directing radiation to be detected into the material, electrical connections connected to the mass and thereby defining a current path crossed transversely by radiation in the material, cooling means for cooling the semiconductor mass, means for establishing cyclotron resonance of majority current carriers within the mass, whereby the conductivity of the mass is changed when radiation of a frequency equal to the cyclotron resonance frequency of the current carriers is directed into the material.

According to the invention in one aspect a radiation detector comprises a mass of semiconductor material contained in a reflecting envelope, the envelope defining means by which external radiation gains access into the mass of material and is thereafter subject to multiple reflections so that it makes many traverses in the material, electrical connections connected to the mass and thereby defining a current path crossed transversely by radiation in the material, cooling means for cooling the semiconductor mass, and means for establishing a magnetic flux in the mass.

In order to make the invention clearer, embodiments of it will now be described, reference being made to the drawings accompanying this specification in which.

Figure 1:
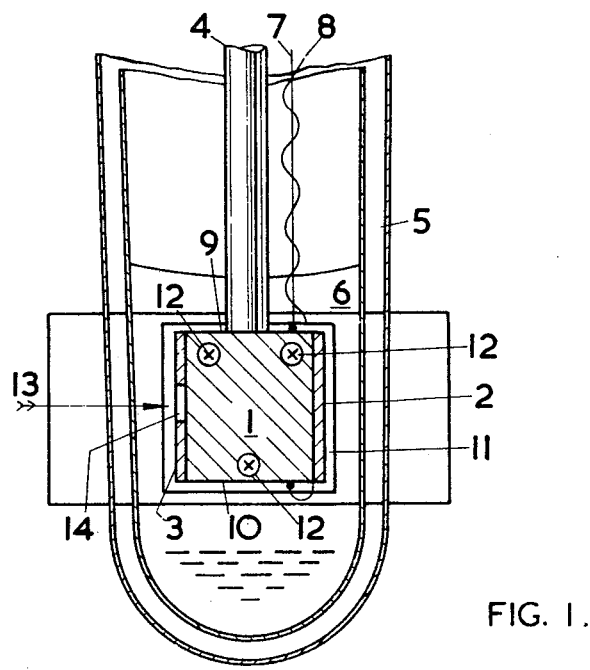
FIG. 1 shows a sectioned view of a detector according to the invention.

In FIG. 1 a mass 1 of a single-crystal, slightly antimony-doped and therefore n-type germanium is provided with a reflecting envelope consisting of plate 2 of conducting material, in this instance silver and a conducting foraminated plate 3 also of silver. The mass 1 is suspended by means of a column 4 in a Dewar flask 5 containing liquid helium 6. Leads 7 and 8 are connected to opposing faces 9, 10 of the mass 1. A magnet, one pole 11 of which only can be seen in the figure, is positioned so that a magnetic flux is established through the mass 1 as indicated by the symbol 12.

In operation radiation is directed in the direction of the arrow 13 and enters the mass 1 through a hole 14 in the plate 3. This radiation traverses the mass 1 many times, being reflected by the plate 2 back to the plate 3 and so on. An electron under the action of the magnetic flux 12 in the semiconductor mass describes a circular orbit after the manner exhibited during so-called cyclotron resonance action—provided its mean free path is longer than the orbital circumference. When the orbital frequency equals the frequency of the incident radiation, the electron absorbs energy from the radiation at the cyclotron resonance frequency only. The energy of the electron is thus raised. Consequently because the mobility of an electron depends upon energy the conductivity of the mass will be changed.

The device accordingly acts as a detector for radiation, the wavelength depending on the type of material (the effective mass of current carriers in the material is important) and the intensity of the magnetic field. The absorption effect is small but the arrangement described by which many traverses are performed in the semiconductor material enables a useful overall effect to be obtained.

A typical n-type germanium device operating to detect radiation at 8 mm. wavelength detected a minimum power of 10–12 watts and had a wavelength range of about 8 mm. of $\lambda/100$. Its speed of response was too fast to be measured but it appeared to respond to frequencies as high as 10 kmc./s.

Figure 2:
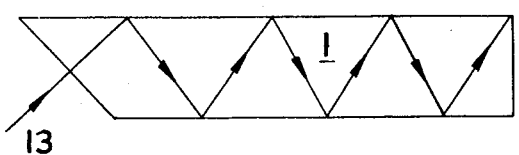
FIG. 2 shows a modification of one part of the detector of FIG. 1.

The reflecting plates 2 and 3 may be thin films of silver or copper or may even be made superconducting; alternatively the mass 1 may be arranged so that it provides its own reflecting envelope by means of total reflection. An alternative construction for the mass 1 is shown in FIG. 2, where multiple traverses of the incident radiation are obtained owing to total reflection.

Figure 4:
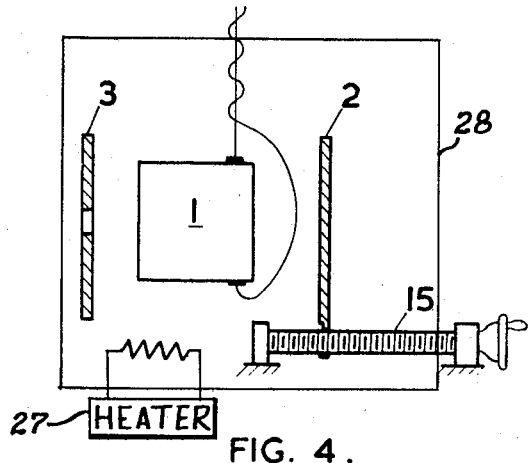
FIG. 4 shows a modification of a second part of the detector of FIG. 1 and also diagrammatically an arrangement for varying the reflecting envelope of the detector of FIG. 1.

One arrangement for the reflecting envelope which may be used in shown in FIG. 4. The plates 2 and 3 are spaced from the mass 1 the plate 2 being provided with a screw drive 15 by means of which it can be moved towards or away from the other plate 3. By varying the distance between the plates 2 and 3 until reflective resonance between the plates exists for the frequency of the radiation to be detected, the reflecting envelope provides a resonant cavity for that frequency. This enables conditions to be optimised for different frequencies of operation. The plate 2 may of course be mounted on the mass 1 as in FIG. 1.

In order to extend the frequency range for which radiation is detected a superconducting magnet may be employed. This would extend the frequency range upwards; in terms of wavelengths (the longer infrared) down to $100/\mu$.

Figure 3:
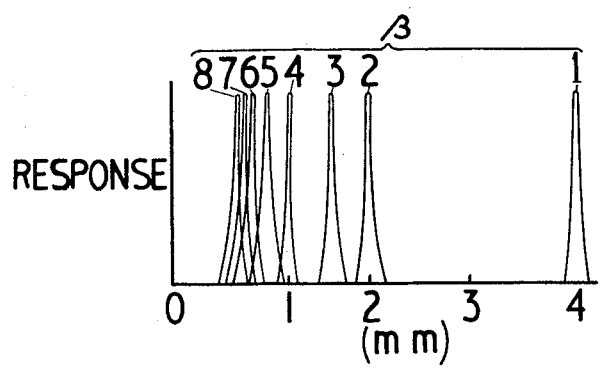
FIG. 3 shows a typical response curve for a detector according to the invention.

If means are provided for changing the magnetic field, detection at several wavelengths may be obtained. This is illustrated by the response curve of FIG. 3 where the responses at different wavelengths are shown to correspond to different field strengths:

| Field (gauss): | Wavelength (mm.) |
|---|---|
| $\beta_1$ | 4 |
| $\beta_2$ | 2 |
| $\beta_3$ | 1.5 |
| $\beta_4$ | 1 |
| $\beta_5$ | 0.875 |
| $\beta_6$ | 0.75 |
| $\beta_7$ | 0.625 |
| $\beta_8$ | 0.5 |

In application the device may be operated as a self-contained spectrometer by virtue of its inherently narrow-band characteristic (bandwidth $\lambda_0/1000$).

It has clear advantages as a simple detector again on account of its narrow band, because a great deal of the background noise wider band detectors would detect is not detected.

Owing to its response at high frequencies of the order of 10 kmc./s. the device may be used as a mixer in conjunction with a suitable local oscillator.

Figure 5:
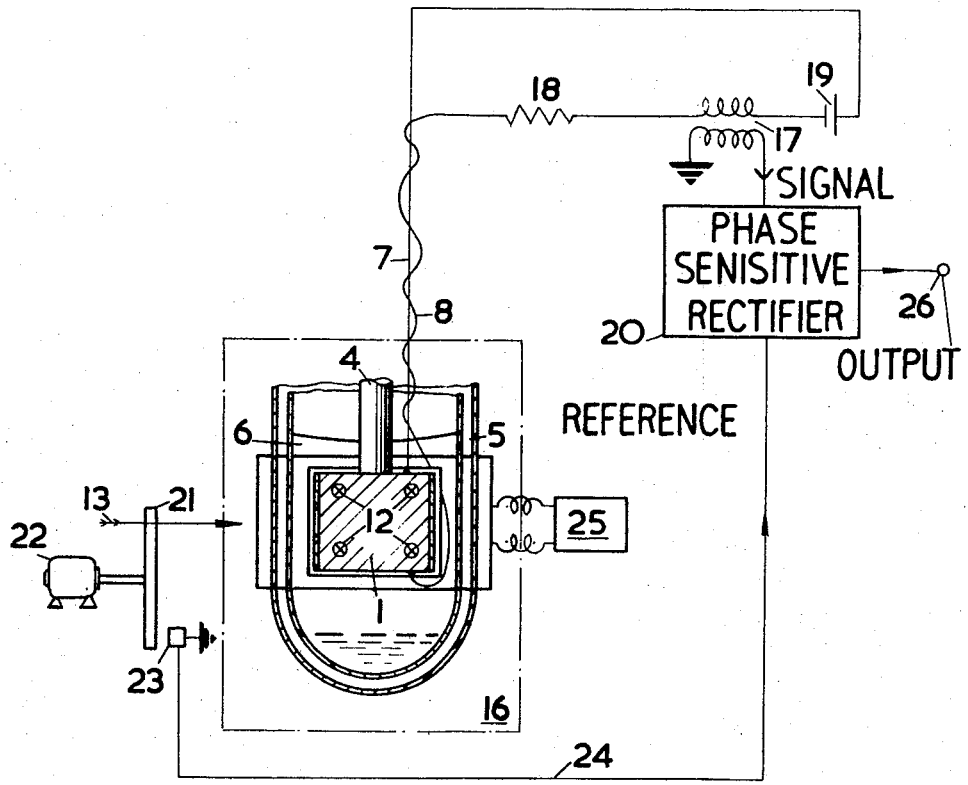
FIG. 5 shows a circuit arrangement of a detector according to the invention.

To use the device as a detector an arrangement as shown in FIG. 5 may be used. The device, shown generally at 16, is connected by its leads 7 and 8 to a signal transformer 17, a load resistor 18 and a battery 19 being connected in series. The transformer 17 connects to the signal input of a phase sensitive rectifier 20.

The path of incident radiation indicated by the arrow 13 is directed through a chopper disc 2 which is driven by a motor 22. A electric pick-off 23 preferably working on the spokes of the chopper disc 21 provides a reference signal for connection over a lead 24 to the phase sensitive rectifier 20. A control means 25 is provided for adjusting the magnetic field of the device 16.

In operation the incident radiation is modulated by the chopper disc 21 and detection by the device 16 results in a modulated current in the primary of the transformer 17. This modulation is detected by the phase sensitive rectifier 20 and a corresponding output appears at an output terminal 26.

In one embodiment of the device instead of using the plates 2 and 3 the mass 1 of n-type germanium of 2 mm.$^2$ area is placed at the position of maximum electric field strength in an $H_{012}$ mode rectangular cavity with its $<100>$ axis parallel to the magnetic field and its $<110>$ axis at right angles. At 4.2° K. the unloaded Q of the cavity is 1,750 and $Q_1$=5,400. The measured responsivity is $2 \times 10^4$ $\mu$volts/$\mu$watt and the detectivity normalised for an area of 1 cm.$^2$ and a bandwidth of 1 c./s., ($D^x$) is $10^{11}$ cm./watt.

In the examples described the semiconductor material is n-type and is in fact very pure material in which what impurities do exist are definitely n-type; the cyclotron resonance of electrons is therefore considered although it should perhaps be made clear that p-type material may also be used, involving the cyclotron resonance of holes. Other semiconductor materials than germanium may be chosen without going outside the invention.

In the case of germanium the resistance of the mass may be so high at liquid helium temperatures as to limit the speed of response of the detecting circuit to a value considerably below that at which the detecting element is capable of operating. This resistance can be very much reduced without impairing the responsivity of the detector greatly by raising the temperature of the mass a little above the normal boiling point of helium. Conventional cryostat techniques can be used for this purpose as shown in FIG. 4; a small heater 27 is inserted in a metal box 28 which surrounds the mass 1.

The semiconductor material used determines the wavelength characteristic of the device because the wavelength depends on the "effective" mass of the electrons or holes in the material. In Ge and Si this is a function of the crystal direction but the minimum value for Ge is about 0.13 $m_e$. For InSb however $m^x$ is 0.013 $m_e$. Hence InSb would enable us to go to wavelengths shorter by X10 for the same magnetic field.

The formula is $$\frac{2\pi_0}{\lambda} = \frac{B.e}{m^x}$$

Hence $$\frac{\lambda B}{m^x} \frac{2\pi_0}{e}$$

For Ge at $\lambda$=8 mm., $m^x$=0.13 $m_e$, $B$=1.9 kgauss; and when $\lambda$=0.8 mm., $B$=19 kgauss.

An alternative arrangement of the output circuit of the device is to connect the leads 7 and 8 across a load resistor and battery in series and then to connect the phase sensitive rectifier 20 across these leads. If amplification is required an amplifier is combined with the input circuit of the rectifier 20.

What we claim is:

1. A radiation detector comprising a mass of semiconductor material contained in reflecting envelope means for admitting external radiation into the mass of material and for thereafter reflecting it in a multiplicity of paths transversely through the material, means for measuring the conductance of the mass, comprising electrical connections connected to the mass and thereby defining a current path crossed transversely by radiation in the material, cooling means for cooling the semiconductor mass, and means for establishing a magnetic flux in the mass.

2. A radiation detector as claimed in claim 1, wherein the means for establishing the magnetic flux includes means for varying the flux.

3. A radiation detector as claimed in claim 1, wherein the reflecting envelope means comprises an outside envelope of the semiconductor material the multiple paths extending from one side of the envelope to another within the material.

4. A radiation detector as claimed in claim 1, wherein the reflecting envelope means comprises a pair of opposed reflecting plates having the mass of semiconductor material located between them, one of the plates possessing an aperture through which external radiation is directed into the material.

5. A radiation detector as claimed in claim 4, wherein at least one of the reflecting plates is adjustable in its distance from the other thereby facilitating optimisation of radiation path conditions within the semiconductor mass.

6. A radiation detector as claimed in claim 1, wherein the reflecting envelope means comprises a resonant cavity.

7. A radiation detector as claimed in claim 6, wherein the semiconductor material is n-type material.

8. A radiation detector comprising:
    a mass of semiconducting material;
    means for directing radiation to be detected into the material;
    means for measuring the conductance of the mass in a current path crossing the radiation path in the material transversely;
    cooling means for cooling the mass;
    means for establishing a magnetic flux in the mass transverse to the radiation path and to the electric current path; and
    means for reflecting the radiation whereby it makes several transversals of that part of the mass lying in the current path and the magnetic field.

9. A radiation detector as claimed in claim 8, wherein a box surrounds the mass of semiconductor material and a heater element is located in the box.

10. A radiation detector as claimed in claim 8, wherein a chopper device is located in the path of radiation directed on to the detector and the electrical connections connect the semiconductor material in a current circuit feeding a phase sensitive rectifier, and means for feeding a reference signal to the rectifier from an auxiliary radiation detector positioned to co-operate with the chopper device.

References Cited by the Examiner

UNITED STATES PATENTS 2,953,688  9/1960  Maxwell et al. _____ 250—83.3
2,954,477  9/1960  Pedersen et al. _____ 250—211
3,050,627  8/1962  Miller _____ 250—83.3

OTHER REFERENCES

Anisotropy of Cyclotron Resonance of Holes in Germanium, by Dexter et al., from Physical Review, volume 95, No. 2, July 15, 1954, pages 557 and 558.

Cyclotron Resonance Experiments in Silicon and Germanium, by Dexter et al. from Physical Review, volume 104, No. 3, November 1, 1956, pages 637–644.

Effective Masses of Electrons in Silicon, by Dexter et al., from Physical Review, volume 96, No. 1, Oct. 1, 1954, pages 222 and 223.

RALPH G. NILSON, *Primary Examiner.*

ARCHIE R. BORCHELT, *Examiner.*